(12) United States Patent
Völkl et al.

(10) Patent No.: US 11,213,037 B2
(45) Date of Patent: Jan. 4, 2022

(54) PROCESS FOR CUTTING ELASTIC STRANDS, IN PARTICULAR MEAT STRANDS AND CUTTING MACHINE THEREFOR

(71) Applicant: TVI Entwicklung & Produktion GmbH, Irschenberg (DE)

(72) Inventors: Thomas Völkl, Bruckmühl (DE); Martin Mayr, Eiselfing (DE)

(73) Assignee: TVI ENTWICKLUNG & PRODUKTION GMBH, Irschenberg (DE)

( * ) Notice: Subject to any disclaimer, the term of this patent is extended or adjusted under 35 U.S.C. 154(b) by 0 days.

(21) Appl. No.: 16/356,932

(22) Filed: Mar. 18, 2019

(65) Prior Publication Data

US 2019/0281843 A1    Sep. 19, 2019

(30) Foreign Application Priority Data

Mar. 19, 2018   (DE) .......................... 102018106300.8

(51) Int. Cl.
*A22C 7/00*   (2006.01)
*A22C 17/00*   (2006.01)
(Continued)

(52) U.S. Cl.
CPC ............ *A22C 17/002* (2013.01); *A22C 7/003* (2013.01); *A22C 7/0038* (2013.01);
(Continued)

(58) Field of Classification Search
CPC ....... A22C 7/00–7/0092; A22C 17/006; A22C 17/002; A22C 17/0033; A22C 17/02;
(Continued)

(56) References Cited

U.S. PATENT DOCUMENTS

| 1,863,609 | A | * | 6/1932 | Vanderkloot | ........ A22C 7/0061 99/351 |
| 1,975,916 | A | * | 10/1934 | Bech | .................... A22C 7/0061 141/249 |

(Continued)

FOREIGN PATENT DOCUMENTS

| CH | 712423 | A2 | 10/2017 |
| CN | 107379055 | A2 | 11/2017 |

(Continued)

OTHER PUBLICATIONS

Chinese Office Action (with English Machine Translation) dated Jun. 28, 2021, Application No. 201910207168.2, Applicant TVI Entwicklung & Produktion GmbH, 22 Pages.

*Primary Examiner* — Drew E Becker
(74) *Attorney, Agent, or Firm* — Brooks Kushman P.C.

(57) ABSTRACT

A method for slicing meat loafs that have a cross section that varies across their longitudinal extension into accurately weighted slices, that includes the steps of bringing the loaf into a defined shape with a uniform cross section across its length inside a forming tube by pressing the loaf before it is sliced. The pressing is performed in a longitudinal direction and a transversal direction relative to the loaf in a predefined order and in particular in multiple pressing steps. The pressing may also comprise pressure relieving strokes for the purpose of reducing the force exertion for pressing, and for keeping the tissue structure of the loaf intact.

20 Claims, 6 Drawing Sheets

(51) Int. Cl.
*A22C 17/02* (2006.01)
*B26D 7/01* (2006.01)
*B26D 5/00* (2006.01)
*A23P 30/10* (2016.01)
*B26D 7/32* (2006.01)
*B26D 7/30* (2006.01)

(52) U.S. Cl.
CPC ........ *A22C 7/0061* (2013.01); *A22C 17/0033* (2013.01); *A22C 17/02* (2013.01); *A23P 30/10* (2016.08); *B26D 5/00* (2013.01); *B26D 7/01* (2013.01); *B26D 7/30* (2013.01); *B26D 7/32* (2013.01); *B26D 2210/04* (2013.01)

(58) Field of Classification Search
CPC ... B26D 5/00; B26D 7/01; B26D 7/30; B26D 7/32; B26D 2210/04; A23P 30/10
USPC .................................................. 426/513, 518
See application file for complete search history.

(56) References Cited

U.S. PATENT DOCUMENTS

| | | | | |
|---|---|---|---|---|
| 2,043,366 A | * | 6/1936 | Bech | A22C 7/0023 100/232 |
| 2,241,807 A | * | 5/1941 | Cotner | B30B 15/26 91/524 |
| 2,565,245 A | * | 8/1951 | Lebovitz | A22C 7/00 100/38 |
| 2,693,752 A | * | 11/1954 | Garapolo | B65B 1/24 100/51 |
| 2,880,668 A | * | 4/1959 | Cranke | A22C 7/0023 100/232 |
| 3,040,654 A | * | 6/1962 | Opie | A22C 7/0046 100/347 |
| 3,114,644 A | * | 12/1963 | Peterson | B65B 25/067 426/404 |
| 3,527,083 A | * | 9/1970 | Hensgen | G01G 19/00 73/32 R |
| 3,576,162 A | * | 4/1971 | McBrady | A22C 7/0023 100/345 |
| 3,650,120 A | * | 3/1972 | Harza | B09B 3/0025 62/62 |
| 3,687,067 A | * | 8/1972 | Bettcher | A22C 7/0046 100/218 |
| 3,753,398 A | * | 8/1973 | Dohm, Jr. | A22C 7/0023 100/344 |
| 3,756,231 A | * | 9/1973 | Ross | A22C 7/0046 100/232 |
| 3,852,507 A | * | 12/1974 | Toby | A22C 7/0046 426/513 |
| 3,990,336 A | * | 11/1976 | Soodalter | B26D 3/22 83/404.2 |
| 4,237,581 A | * | 12/1980 | Langen | A22C 7/00 100/37 |
| 4,436,499 A | * | 3/1984 | Ferrighi | A47J 43/20 425/195 |
| 4,800,094 A | * | 1/1989 | Freda | B26D 7/0608 426/513 |
| 5,431,935 A | * | 7/1995 | Carey | A22C 7/0046 426/231 |
| 5,482,166 A | * | 1/1996 | Brown | A22C 17/002 209/580 |
| 6,101,913 A | * | 8/2000 | Gahmberg | B26D 1/09 83/176 |
| 7,687,093 B2 | * | 3/2010 | Nielsen | A23B 7/045 426/513 |
| 10,245,745 B2 | * | 4/2019 | Volkl | B26D 7/0608 |
| 10,875,207 B2 | | 12/2020 | Völkl et al. | |
| 2003/0113422 A1 | * | 6/2003 | Groneberg-Nienstedt | A22C 7/0023 426/513 |
| 2009/0255419 A1 | * | 10/2009 | Kirsch | A22C 7/003 99/538 |
| 2014/0179209 A1 | * | 6/2014 | Weng | A22C 17/002 452/194 |
| 2017/0035066 A1 | * | 2/2017 | Hukelmann | A23L 13/72 |
| 2020/0345019 A1 | * | 11/2020 | Voelkl | A22C 17/0006 |
| 2021/0092967 A1 | * | 4/2021 | Voelkl | A22C 7/003 |

FOREIGN PATENT DOCUMENTS

| | | |
|---|---|---|
| DE | 102004041915 A1 | 3/2006 |
| DE | 102008022173 A1 | 11/2008 |
| EP | 2241421 A1 | 10/2010 |
| EP | 3238898 A1 | 11/2017 |
| WO | 2009052865 A1 | 4/2009 |

\* cited by examiner

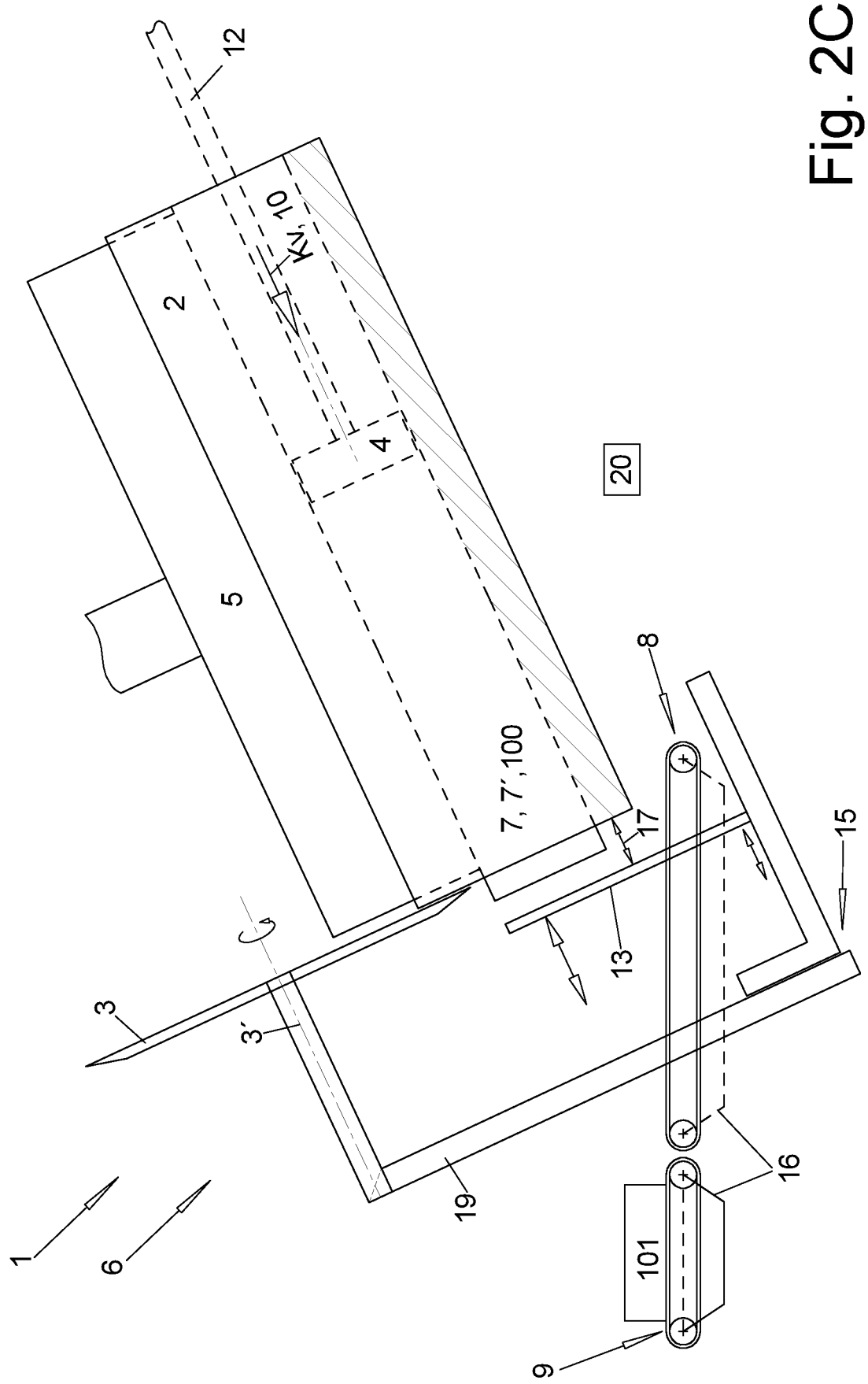

PROCESS FOR CUTTING ELASTIC STRANDS, IN PARTICULAR MEAT STRANDS AND CUTTING MACHINE THEREFOR

CROSS-REFERENCE TO RELATED APPLICATIONS

This application claims priority to German Patent Application No. 102018106300.8 filed on Mar. 18, 2018 to Thomas Völkl and Martin Mayr, currently pending, the entire disclosure of which is incorporated herein by reference.

FIELD OF THE INVENTION

The invention relates to the pressing of a loaf that is made of an elastic material, such as for example a meat loaf, which in the initial state has a cross section which varied across its length, so that it gets a cross section that is constant across its length, and optionally to the subsequent slicing into slices, in particular into slices that are weighted as accurately as possible.

BACKGROUND OF THE INVENTION

For the purposes of the present invention, meat loafs will often be referred to in the following without limiting the invention to this particular kind of loaf made of an elastic material.

Accurately weighted slices or servings from an elastic strand can be produced relatively easily if the strand, the so-called caliber, has the same cross section throughout across its entire length and is made of a homogenous elastic material that is the same throughout, such as sausages or cheese.

What is known for this purpose are so-called slicers, which in most cases respectively cut off one slice with a rotating, round or spiral-shaped blade, which can e.g. be moved back and forth transversely with respect to the strand, while the strand, which is in most cases exposed during the process, is continuously moved forward.

However, an irregularly shaped loaf of unprocessed meat, e.g. a topside, does not have these characteristics, since each piece has a different size and shape, and moreover a cross section that varies across its length and consist of material components of different texture, elasticity and compressibility, for example of fat, muscle tissue, the surrounding silverskin, and where appropriate also bones, such as in a loin, which respectively show very different mechanical behaviors.

In this context it is already known to initially deform an irregularly shaped loaf in such a manner that it has a defined known cross section at least at that end at which the next slice is cut off, preferably across the entire length, in particular at the point in time when the slice is cut off.

Then, a relationship between the adjustable thickness of the slice and the desired weight of the slice can be provided, even if not exactly, since the composition of the meat, which has components with different specific weights, can already change from one slice to the next.

To achieve the deformation, in most cases the—usually slightly frozen—loaf is at first inserted into a circumferentially closed forming tube, and pressed in the axial direction against a stop collar by means of a longitudinal pressing plunger, so that the loaf widens in its cross section so as to fill out the entire inner free space of the forming tube and thus to also take on its cross section.

Here, forming tubes of different cross sections can be used, depending on the dimensions of the loaf.

Further, it is additionally possible to vary the inner cross section of the forming tube after the loaf had been inserted, for example by moving two opposing side walls of the forming tube towards each other, thus also effecting a transversal pressing of the loaf.

For this purpose, in most cases a fitting transversal pressing plunger is radially moved into the open side of a forming tube duct (as viewed in the longitudinal direction), which is thus a component of the wall of the forming tube.

After all, starting from a certain initial cross section of the inner free space of the pressing plunger, a substantially stronger pressing is necessary due to the shortening of the loaf during pressing in only one direction, for example only in longitudinal direction, than if the reshaping process is divided into 2 or even 3 different pressing directions.

In this manner, the inner structure of the loaf is handled more gently, with the loaf in particular being a directed structure, as it is for example present in the muscle content of an elongated meat loaf which is directed approximately in the longitudinal direction of the meat loaf.

At the end of the pressing, the cross section and the length and thus the volume and the weight of the loaf is also estimated based on the position of the pressing plunger in order to determine the thickness of a slice, which is supposed to have a certain weight.

SUMMARY OF THE INVENTION

Thus, it is the objective according to the invention to provide a method as well as a machine for pressing the loaf into a cross section that is constant across its length, and preferably for the subsequent slicing of such a loaf, which ensures a maximally gentle treatment of the loaf material.

As for the method, before the loaf is sliced, it is already known to bring the initially still irregularly shaped loaf formed from an elastic, in most cases only slightly compressible, material into a shape with a cross section that remains constant across its length, for example by inserting the loaf into a forming tube and by pressing it inside the same in the longitudinal direction as well as in the transversal direction of the forming tube by means of respectively one pressing plunger.

The basic idea of the invention is to treat the loaf to be pressed in a more gentle manner and for this purpose, after the pressing plunger had been moved forwards and the loaf had been pressing by the pressing plunger (pressing stroke), to not leave the same in the reached, displaced position, but rather to slightly pull back the pressing plunger again afterwards—either directly afterwards or after other processes had been performed —, and in this manner to somewhat relieve the loaf from the previously applied compressive force (relieving stroke).

Although in this manner the previously achieved deformation is partially lost again, the material of the loaf has a change to settle into and assume an inner structure that has inner stresses which are as low as possible, so that the required total reshaping of the loaf can be achieved with a lesser change to the inner structure of the loaf than is the case either with a pressing only in one pressing direction and/or with a pressing only with a pressing stroke and without relieving stroke, i.e. backward stroke, of the respective pressing plunger.

Further, the reduction of the compressive force in a first pressing direction leads to a lesser adhesive friction of the loaf at the forming tube, and thus to an exertion of a lesser force during subsequent pressing in the second pressing direction. In this context, it should be clarified than even if a pressing plunger is stationary, the compressive force applied to the other pressing plungers increases through another pressing plunger performing a pressing stroke, or these other pressing plungers are pressed back, since the pressure created in the loaf acts in all directions.

Thus, in a first pressing step in a first pressing direction, a pressing of the loaf is performed through a pressing stroke up to a first stroke target value for this pressing direction with the corresponding first pressing plunger, namely as soon as this pressing plunger rests against the loaf.

Further, in a second pressing step in a second pressing direction, a pressing through a pressing stroke up to a first stroke target value is also performed for this pressing direction with the corresponding second pressing plunger, wherein also in this case the pressing and the pressing stroke begin as soon as the pressing plunger rests against, i.e. comes into contact with, the loaf, if this was not already the case.

In at least one of the two pressing steps, a relieving stroke is performed by drawing back the corresponding pressing plunger counter to its pressing direction directly after the pressing stroke or with a time lag to it, in particular after a minimum dwell time has passed and/or other measures have been performed on the loaf.

Preferably, the relieving stroke is performed in each of the two pressing steps.

Each of the two forward strokes in the corresponding pressing direction as well as each of the relieving strokes can be performed in succession multiple times, wherein in that case the corresponding plunger already rest at the loaf before the next pressing stroke—either multiple times in direct succession, or with pressing or also relief occurring in the other transversal direction in the meantime.

Each of the strokes—the pressing stroke as well as the relief stroke—can thus be performed in multiple, in particular directly consecutive, stages respectively up to the partial target values.

At the end of the pressing procedure, each of the pressing plungers takes an end target value with respect to the control parameter, based on which it is controlled. Here, the end target value can well be lower than one of the stroke target values that have been previously predefined and reached in the same pressing direction, and the end target value can also be reached at the end of a relieving stroke, not only at the end of a pressing stroke:

A pressing plunger can be power-controlled, so that the target value at the end of the pressing is a certain compressive force or a certain pressure which is applied to the pressing plunger and with which it presses against the loaf.

In a power-controlled plunger, the end target value is in particular the measuring force at which the volume determination is to be performed.

The pressing plunger can also be position-controlled, so that the target value is a certain position of the pressing plunger in its pressing direction, in particular relative to the forming tube.

However, not all present pressing plungers can be position-controlled, since the individual loafs have different volumes, but with exclusively position-controlled pressing plungers the final state after pressing would always have to have the same volume.

However, this is not possible since, depending on its martial composition, the loaf can often be compressed either only to a small degree or almost not at all.

If by contrast all three pressing plungers were power-controlled, the loafs would have different diameters in the pressed state in both transversal directions, which already represents an additional difficulty in producing accurately weighted slices, since in that case at first different diameters would have to be determined in both transversal directions of the inner free space of the forming tube for each loaf in the pressed state depending on the actual positions of the individual power-controlled pressing plungers.

Usually, the longitudinal pressing plunger moves in the interior of the forming tube that is formed by at least one transversal pressing plunger and the other circumferential walls of the forming tube duct.

Preferably, the transversal pressing plunger and also the forming tube duct into which it fits have a fixed width, even if this fixed width is only reached by moving the side walls of the forming tube duct towards each other up to this smaller fixed width after the loaf has been inserted from an insertion distance located further away.

In the most simple approach, the transversal pressing plunger is advanced up to a predefined target position as the end target value in this transversal direction, so that what results is a cross section of the forming tube that corresponds to the contact surface of the longitudinal pressing plunger with a fixed shape and size of its contact surface.

In that case, the control parameter for the longitudinal pressing plunger is the compressive force.

Often, the control parameter for the transversal pressing plunger is also the compressive force, and in that case the longitudinal pressing plunger must have a variable extension in the first transversal pressing direction in which the transversal pressing plunger moves, for example in that it consists of two meshing parts, which are in particular pre-stressed against each other in the direction in which the two parts are pressed apart in order to fill out the inner free cross section of the forming tube.

Preferably, the stroke target value of the relieving stroke is only maximally 30%, better maximally 20%, better maximally 10% of the stroke target value of the previous pressing stroke anyway, and primarily serves for reducing the adhesive friction between the loaf that is pressed together by the pressing stroke and the forming tube, before the pressing is performed in another pressing direction in the next pressing step.

In absolute values, the relieving stroke is between 0.5 mm and 6 mm, better between 2 mm and 5 mm in the transversal pressing direction, and/or between 2 mm and 20 mm, better between 3 mm and 15 mm, better between 4 mm and 10 mm in the longitudinal pressing direction.

With respect to the temporal relationship, the individual strokes, in particular the individual pressing steps, can be are performed consecutively, or can also be performed with a partial or complete time overlap. In particular, one pressing plunger can already be advanced, i.e. pressing can be performed, as the other pressing plunger is being withdrawn.

In particular if the individual pressing steps are performed consecutively, either the sequence of first and second pressing step can be performed multiple times in succession, or also only the first or only the second pressing step can be performed directly or not directly in succession multiple times, wherein it is not absolutely necessary to carry out a relief stroke in between every time.

Preferably, the transversal pressing is started, so that the first pressing direction is thus the transversal direction into which the transversal pressing plunger can be moved.

In this transversal pressing, it is not yet necessary that the loaf is tightly received with its face ends between the longitudinal pressing plunger on the one hand and an opposite stop collar on the other hand.

However, if a support structure is present in the loaf that extends in its longitudinal direction and is not elastic or only elastic to a limited extent, in particular a bone or a bone strand, as is the case with a loin, end stops are placed at the face ends prior to transversal pressing of the loaf in the longitudinal direction, but they are preferably only received therein without force in a tightly abutting manner or with a very low longitudinal compressive force at most, which in particular corresponds to maximally a tenth of the longitudinal measuring force.

An often used pressing process comprises the following steps S1 to at least S4:

S1) In a first pressing step, the transversal pressing plunger is moved for-wards against the loaf in a first transversal pressing direction and, as soon as it rests against the loaf, is moved further by a transversal pressing stroke for pressing until a first stroke target value or the end target value of the transversal control parameter is reached, S2) after this transversal pressing stroke, the transversal pressing plunger is withdrawn by a transversal relieving stroke, with its distance preferably being smaller than the value of the distance of the transversal pressing stroke, in particular by 0.5 mm to 6 mm, S3) subsequently, in a second pressing step, the longitudinal pressing plunger is moved forwards against the loaf in the longitudinal direction and, as soon as it rests against the loaf, is moved further by a longitudinal pressing stroke for pressing, until a first stroke target value or the end target value of the longitudinal control parameter is reached, S4) following this longitudinal pressing stroke, the longitudinal pressing plunger is withdrawn by a longitudinal relieving stroke (−L) of in particular 6 mm to 20 mm, these two pressing steps or also only the first pressing step are repeated, where appropriate with increased partial target values, wherein in particular S5) the longitudinal pressing plunger is moved forwards against the loaf in the longitudinal direction, until in particular the measuring force is reached as the end target value of the longitudinal control parameter, while the stroke target value in step S3 was lower than the measuring force.

If both pressing plungers are stationary under their respective measuring force for this pressing direction, the length and cross section of the pressed loaf are automatically determined and used by the control for automatically controlling the slicing process based on the positions of the plungers in their respective pressing direction.

Following step S4 and in particular prior to the pressing step, with its stroke target value in the longitudinal direction being the measuring force, it is optionally possible to at first perform a relieving stroke in the transversal direction and subsequently also optionally perform a renewed pressing stroke in the transversal direction, wherein the value of these two strokes is preferably equal, or the values deviate from each other by no more than 20%, better by no more than 15%, better by more than 10%, based on the lower of both values.

In summary, a relieving stroke is thus performed in the counter direction after at least one pressing stroke, independently of in which direction it occurred.

A parameter for determining the target values could be the elasticity or hard-ness of the meat loaf, which in turn depends on the degree of frosting of the loaf, which is determined on the one hand by the temperature of the loaf on its outer side, but above all by how thick the frozen outer layer of the loaf is.

The stronger the frosting, the higher the compressive forces have to be chosen in order to be able to deform the loaf.

In the normal case, the frozen outer layer of the meat loaf is no thicker than 2-10 mm. In that case, in a meat loaf of pork or beef, a force of between 1000 N and 4000 N, better of between 2000 N and 3000 N, is applied to the longitudinal pressing plunger, and/or in contrast, a force of 10.000 N to 30,000 N, better of between 15,000 N and 25,000 N is applied to the transversal pressing plunger.

In order to make sure that the slices are not strongly re-deformed after being severed from the loaf, it can be advantageous to at first exceed the end tar-get value of a pressing plunger's control parameter through the stroke target value as the pressing plunger is being advanced, in particular in the last pressing step of the respective pressing direction, i.e., to over-press the loaf, and to subsequently return to the end target value by a relieving stroke.

Such an over-pressing preferably occurs in the last pressing step before pressing is stopped.

What can also be advantageous is a sufficient dwell time, in particular in the over-pressed state, but also between each pressing stroke and the following relieving stroke, in particular of at least 0.1 s, better of at least 0.3 s, but no more than 2.0 s, better no more than 1.5 s, better no more than 1.0 s.

However, the over-pressing should be performed to be maximally so strong that the size of the meat loaf in the respective pressing direction lies below the final dimension by no more than 20%, better by no more than 10%, when a measuring force is applied.

Especially if the longitudinal pressing plunger is that pressing plunger which is moved in between the other forming parts and the longitudinal pressing plunger has no smooth and continuous press surface, as it consists of two or even more structural components in one of the extension directions of its contact surface, the longitudinal pressing plunger should not rest against the loaf during the pressing stroke of the transversal pressing plunger.

In this manner, it is avoided that the material of the loaf enters the gap be-tween the two parts of the longitudinal pressing plunger that are movable with respect to each other as that gap becomes smaller during transversal pressing.

Especially in a loaf that is very slim in the non-pressed state and/or a loaf with a cross section that is highly uniform across its length, it is also possible to work with a longitudinal pressing plunger having a continuously closed press surface, with its shape and size corresponding to the target cross section of the forming tube after pressing. However, a transversal distance is thus still present between the longitudinal pressing plunger and the transversal pressing plunger in the transversal direction at the beginning of the transversal pressing.

This can in particular be accepted if the transversal pressing is begun with as a first pressing step, and in this way the gap between the longitudinal pressing plunger and the transversal pressing plunger is so small already after the first pressing step that there is no more risk of the loaf material passing through it during subsequent first longitudinal pressing.

To split up the entire reshaping process not only into two but even three pressing directions, it is further possible to press in the second transversal direction, as well.

For this purpose, the forming tube duct into which the transversal pressing plunger is inserted in the first transversal pressing direction as a part of the wall of the entire forming tube, consists not of a one-piece U-profile or C-profile, but rather one of the freely ended side walls of these U-profile or C-profile can be adjusted in the direction towards the opposite side wall, and is thus formed as a transversal restricting plunger.

If this is intended, such a transversal restricting plunger that glides along the angled forming tube part with only one of its narrow sides is preferably moved forward in a position-controlled manner up to a certain width of the forming tube duct, whereby the non-pressed loaf, which in most cases is oval in cross section, may possibly not even pressed in its cross section, but is only rotated. However, independently of this fact, the term transversal pressing is maintained to refer to it.

In that case, this target width of the forming tube duct then corresponds to the width of the transversal pressing plunger as well as to the width of the longitudinal pressing plunger.

By contrast, if this side wall of the forming tube duct embodied as a transversal restricting plunger was power-controlled, the transversal pressing plunger would be designed to be variable in its width, which entails the disadvantage of a non-continuous and thus not gap-free and not smooth press surface, not to mention the increased constructional effort for such a multi-part pressing plunger.

As known for the slicing the loaf, the loaf that is pressed against a longitudinal stop collar inside the forming tube is subsequently advanced by means of the longitudinal pressing plunger in the longitudinal direction to beyond the front end, the cutting blade end, of the forming tube by a predefined thick-ness that corresponds to the thickness of the slice to be produced, preferably until it comes to rest against a stop plate that its adjustable in its longitudinal position. The longitudinal stop collar can be the stop plate that is moved to the end face of the forming tube, or can be a separate intermediate plate that can be moved into the cross section of the forming tube.

This is usually repeated until the entire loaf is sliced.

Here, a feed force, which preferably corresponds to the measuring force or deviates from the same by no more than 10%, is applied to the longitudinal pressing plunger.

As has already been explained with regard to the method, already according to the state of the art, the machine according to the invention comprises a forming tube which is open at both face ends and inside of which a longitudinal pressing plunger is guided in the longitudinal direction of the forming tube in a displaceable manner, as well as a transversal pressing plunger that rep-resents a part of the wall of the forming tube, for example by the rest of the forming tube forming a forming tube duct, with the transversal pressing plunger being insertable into its open side in a precisely fitting manner.

The free inner cross section of the forming tube is preferably not round, but rather has two opposite side walls extending in parallel to each other, and is in particular rectangular or parallelogram-shaped, respectively having strongly rounded corners.

Preferably, the longitudinal pressing plunger has a variable extension of its press surface in the transversal pressing direction into which the transversal pressing plunger can be moved, and if the two side walls of the forming tube duct extending in parallel to each other are adjustable in their mutual distance, the transversal pressing plunger and the longitudinal pressing plunger also have to have a size that is variable transversally to its pressing direction and transversally to the longitudinal direction so as to be able to adjust to the distance between the walls of the forming tube duct.

The machine can also comprise multiple such forming tubes that are arranged in parallel next to each other with their longitudinal directions, with their pressing plungers and pressing methods in that case being preferably controllable independently of each other.

In particular, the machine requires an axial stop collar for the loaf against which the longitudinal pressing plunger can press the loaf, as well as a cut-ting unit, preferably a blade, which can be moved in the transversal direction to its longitudinal direction in front of the frontal cutting edge end of the forming tube for cutting off a slice in the axial direction.

The axial stop collar preferably completely closes the cross section of the forming tube, preferably already at the beginning of the pressing, and is arranged either directly at the cutting-edge-side frontal end face of the forming tube, or can be inserted into the forming tube perpendicularly in a slightly backset manner as a so-called intermediate plate.

As a stop collar element immediately at the end-side end face it is also possible to directly use that stop plate which determines the thickness of the slice to be cut off during subsequent slicing of the loaf with respect to its longitudinal position to the blade and/or to the forming tube.

But above all, such a generic machine also comprises a control that controls all movable parts of the machine.

According to the invention, the control of the machine is able to control the movable parts of the machine according to the previously described method.

For this purpose, the machine can also comprise sensors that measure parameters relevant for controlling the method, for example pressure sensors, force sensors or position sensors at the pressing plungers, pressure sensors or force sensors in the inner surfaces of the forming tube and/or at the longitudinal stop collar.

DESCRIPTION OF THE SEVERAL VIEWS OF THE DRAWINGS

In the following, an advantageous embodiment of the present invention will be explained in more detail making reference to a drawing, in which the individual figures show:

FIG. 2C is a schematic side view of the embodiment of the machine of FIG. 2A at another one of the described functional positions.

DETAILED DESCRIPTION OF THE INVENTION

Figure 1A:
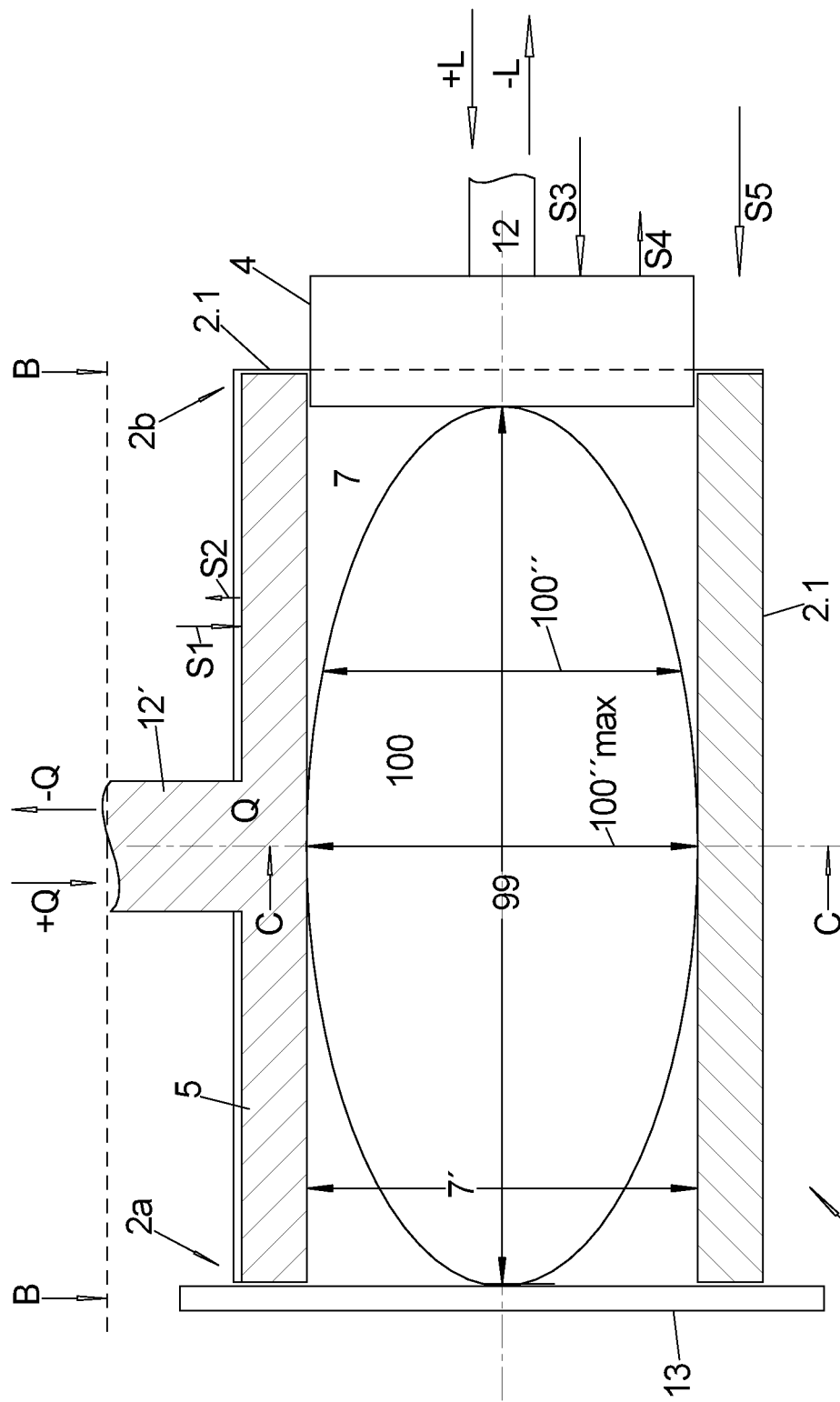
FIG. 1A is a schematic side sectional view showing one embodiment of a forming tube in accordance with the present disclosure.
Figure 1A:
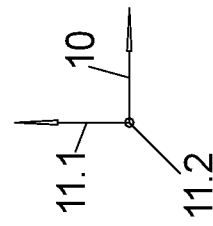

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 1B:
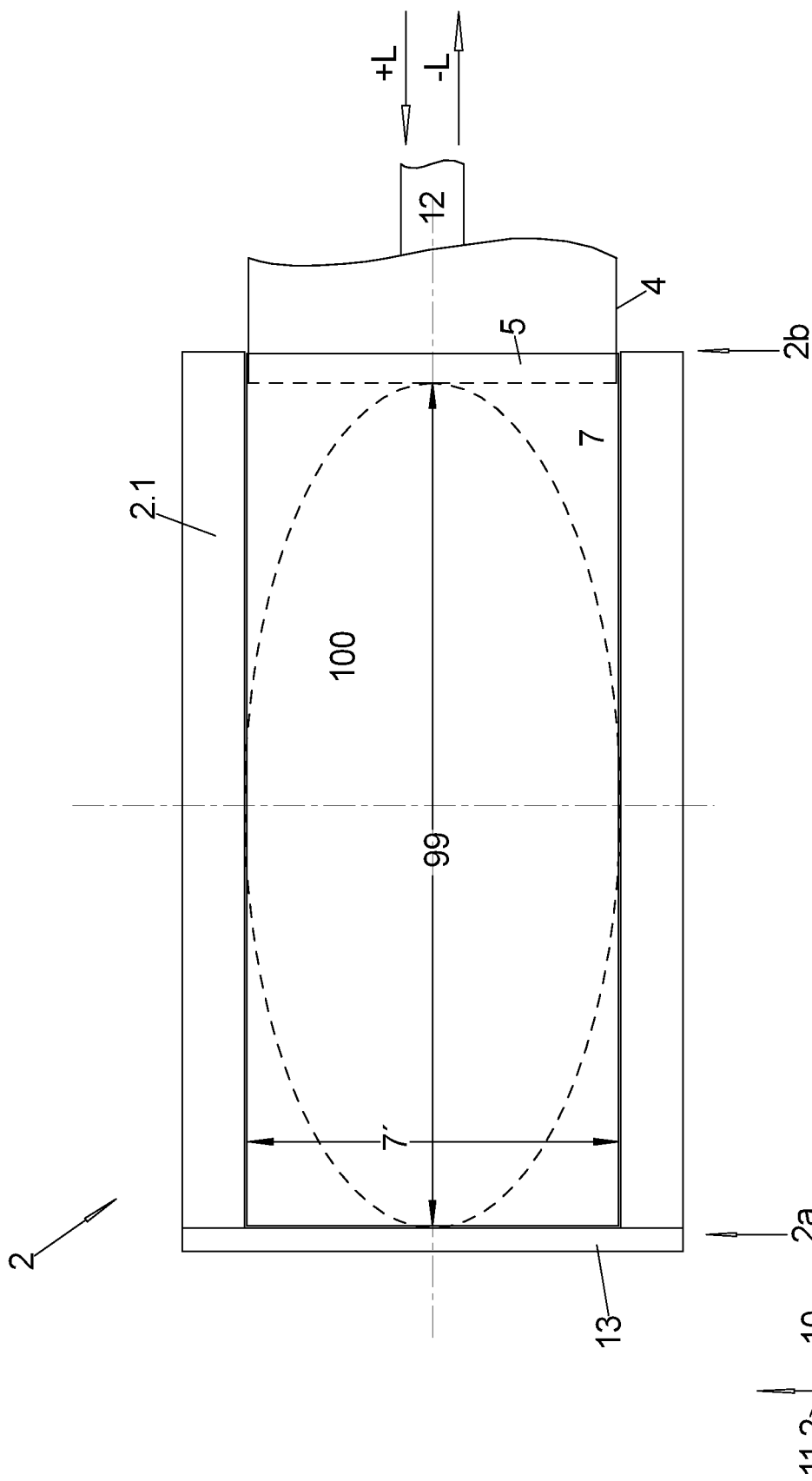
FIG. 1B is a schematic sectional view of the forming tube of FIG. 1A, sectioned along the line B-B.
Figure 1C:
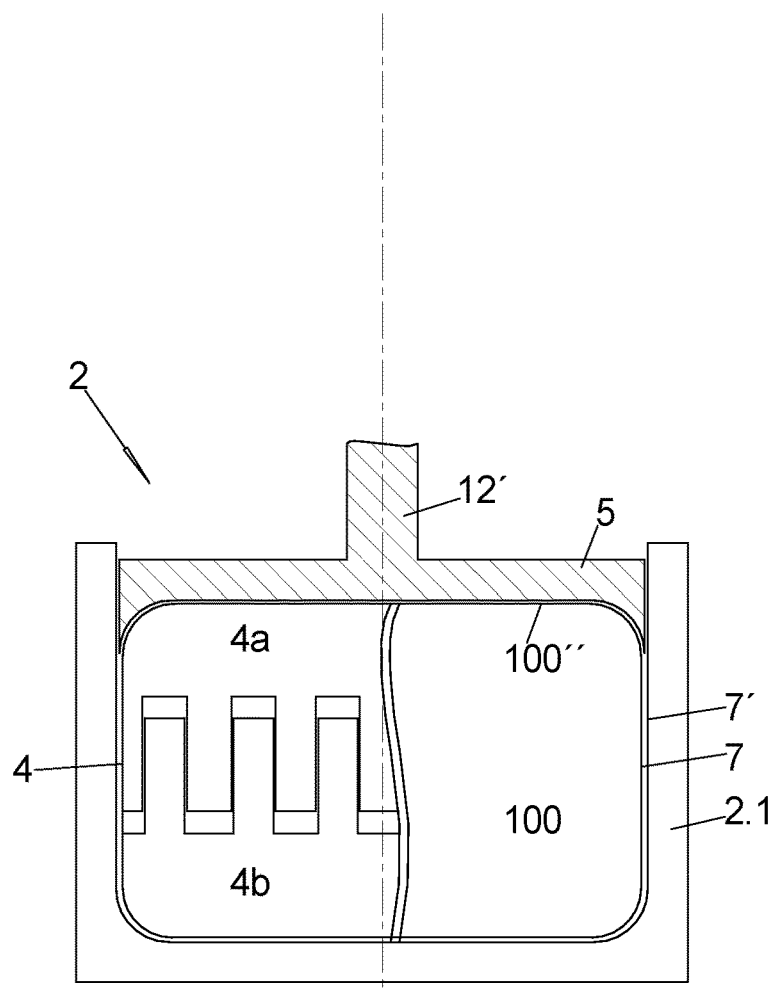
FIG. 1C is a schematic sectional view of the forming tube of FIG. 1A, sectioned along the line C-C.
Figure 1C:
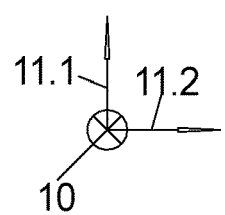

FIGS. 1A-1C show the forming tube 2 in a principle drawing, wherein in FIGS. 1A and 1B, the loaf 100 to be pressed is still in its initial state in which it is approximately elongated-ovate, or has the shape of an American football, with a cross section 100" that changes in the longitudinal direction 10, the direction of its greatest length 99, and has the maximum cross section 100" max approximately in the central area.

As shown in the sectioned view in the longitudinal direction 10 according to FIG. 1C, the forming tube duct 2 consists of a forming tube duct 2.1 that is U-shaped in this cross section and into which a transversal pressing plunger 5 is plunged in a precisely fitting manner from the open side, usually from above, so that together they form a forming tube 2 that is open on the face end at the front and the back.

As shown in FIGS. 1A and 1B, for pressing the loaf 100, the front end, the cutting blade end 2a, of the forming tube 2 is closed by a longitudinal stop collar, in this case for example the stop plate 13 that will be explained in the following, while a longitudinal pressing plunger 4 is plunged into the back end, the loading end 2b, of the inner free space 7 and can be moved in the longitudinal direction 10 to press the loaf 100 in the longitudinal direction 10.

As shown in FIG. 1C, the inner surfaces of the side walls of the U-shaped forming tube duct 2.1 extend in parallel and at a non-variable distance to each other, so that the transversal pressing plunger 5 can have a fixed width in the direction of the width of the opening of the forming tube duct 2.1, the second transversal direction 11.2, and can also have a fixed length in the length 10, namely e.g. corresponding to the length of the forming tube duct 2.1.

For, as shown in FIG. 1B, the longitudinal pressing plunger 4—which in most cases is located at the frontal end of an indicated piston rod 12 of a working cylinder unit that is not shown—moves between the transversal pressing plunger 5, with one side resting against the press surface of the transversal pressing plunger 5 that points downwards in FIG. 1B, and the base of the forming tube duct 2.1.

In order to always completely fill out the free cross section 7' between the forming tube duct 2.1 and the transversal pressing plunger 5 independently of the position of the transversal pressing plunger 5 in the transversal pressing direction Q, the first transversal direction 11.1, it consists of two parts 4a, 4b (as in FIG. 1C, left half) that alternatingly have prongs and recesses on the mutually facing sides and thus mesh into each other, and in this way the transversal pressing plunger 5 can be varied in its extension in this transversal direction 11.1, which is performed automatically since the two parts 4a, b are pre-stressed by means of springs in directions that point away from each other.

In FIGS. 1A and 1B, the loaf 100 is still in its initial state and in the longitudinal direction 10 rests without force e.g. against the stop plate 13, on the one hand, and at the longitudinal pressing plunger 12, on the other hand, and also in the transversal direction 11.1 rests against the base of the forming tube duct 2.1, on the one hand, and at the transversal pressing plunger 5, on the other hand. As a general rule, the transversal pressing plunger 5 is also arranged at the frontal end of a piston rod 12' of a working cylinder unit that is not shown here and that can apply a force to the transversal pressing plunger 5 analogously to the longitudinal pressing plunger 4.

Usually, the longitudinal direction 10 of the loaf 100 that is placed in the initial state into the forming tube 2 corresponds to the longitudinal direction 10 of the forming tube 2—the longitudinal pressing direction L of the longitudinal pressing plunger 4 —, which is assumed in the present application.

In this state, the present hollow spaces in the inner free space 7 of the forming tube 2 around the loaf 100 can be seen, which are not yet filled out by the loaf 100 that is still approximately elongate-ovate.

By further advancing from this state of the longitudinal pressing plunger 4 in the longitudinal pressing direction L in the direction of the cutting blade end 2a of the forming tube 2 and/or of the transversal pressing plunger 5 in the transversal pressing direction Q, the transversal direction 11.1, the loaf 100 is increasingly brought into a shape that completely fills out the inner remaining free space 7 inside the forming tube 2 between the longitudinal stop collar and the longitudinal pressing plunger 4. As can be seen in FIG. 1C in the final pressed state, the loaf 100 has an approximately rectangular cross section with rounded corners corresponding to the design of the cross section of the inner free space 7, and that uniformly across the entire length of the pressed loaf 100.

Since as a general rule longitudinal pressing as well as transversal pressing is performed, in the final pressed state, the pressed loaf 100 has a smaller length in the longitudinal direction 10 and also a differently formed cross section 100", also in particular a smaller maximum cross-sectional surface 100"max than in the non-pressed initial state.

According to the invention, the longitudinal pressing and the transversal pressing are performed not only through the pressing strokes in the respective pressing direction +Q and +L, but also through relieving strokes in the respective pressing direction, i.e. −L, −Q, which are performed in between.

Here, FIG. 1A shows a typical flow of the pressing procedure, starting from the shown non-pressed state of the loaf 100 to the final pressed state in which the loaf 100 fills out the entire remaining inner free space 7 inside the forming tube 2.

Preferably, the longitudinal pressing plunger 4 is already located in the forming tube, i.e. between the transversal pressing plunger 5 and the forming tube duct 2.1, already in the initial state, i.e. in the above-described state in which the non-pressed loaf 100 still rests against the corresponding parts of the forming tube 2 as well as at the stop plate 13 and the longitudinal pressing plunger.

After the pressing plunger 4, 5 rests against the loaf 100, the pressing is performed as follows:

First, in a first step S1, the transversal pressing plunger 5 is moved in a transversal pressing stroke +Q, i.e. in the direction towards the base of the forming tube duct 2.1, and the loaf 100 is thus pressed together in this first transversal direction 11.1.

Subsequently, in a step S2, a relieving stroke −Q is performed with the transversal pressing plunger 5 in the opposite direction by a distance that is smaller than the value of the pressing stroke +Q, and preferably is 2-6 mm, preferably to reduce the adhesive friction between the loaf 100 and the circumferential walls of the forming tube duct 2.

Subsequently or simultaneously, i.e. possibly already during the transversal relieving stroke −Q, or possibly even already during the transversal pressing stroke +Q, in a third step S3 a further advancement of the longitudinal pressing plunger 4 with a longitudinal pressing stroke +L is started in the pressing direction 10 in the direction of the closed cutting blade end 2a of the forming tube 2, thus compressing the loaf 100 in the longitudinal direction 10.

For example, the transversal relieving stroke −Q can be performed in multiple stages with multiple partial target values, and a new part of the longitudinal pressing stroke +L, which is also carried out in steps, can be performed after each stage.

Subsequently, as the step S4, the longitudinal pressing plunger 4 performs a longitudinal relieving stroke −L in the counter direction, with its distance representing only a part of the value of the previous pressing stroke +L in this direction, in particular 6 mm to 20 mm. This longitudinal relieving stroke −L is preferably performed only after the transversal forward stroke +Q, in particular also the transversal relieving stroke −Q, has been concluded.

In individual cases, i.e. if a strong reshaping of the loaf 100 is necessary, this flow and/or only the transversal pressing +Q and/or the transversal relief −Q, can be performed repeatedly.

Usually, the transversal pressing plunger 5 as well as the longitudinal pressing plunger 4 are power-controlled, i.e. controlled via the force applied to the respective pressing plunger, which in the completely pressed state of the loaf is supposed to have a certain end target value.

This end target value may for example be the so-called measuring force, which is predefined separately for the longitudinal pressing plunger 4 and the transversal pressing plunger 5, and which is to be applied to the pressing plungers 4 or 5 if the size of the cross section 100" of the inner free space 7' of the forming tube 2 (which in that case is uniform across its length), and thus of the pressed loaf 100 as well as the length 99 in the longitudinal direction 10 is determined.

This is in particular realized by determining the positions of the pressing plungers 4, 5 in their respective pressing direction Q, L with respect to the forming tube duct 2.1 or the longitudinal stop collar, e.g. in the form of the stop plate 13 at the cutting blade end 2a of the forming tube 2, for example by means of position sensors, which are not shown and which can be in-stalled in the working cylinder units, which are not shown and which act on the pressing plungers 4, 5.

Figure 2A:
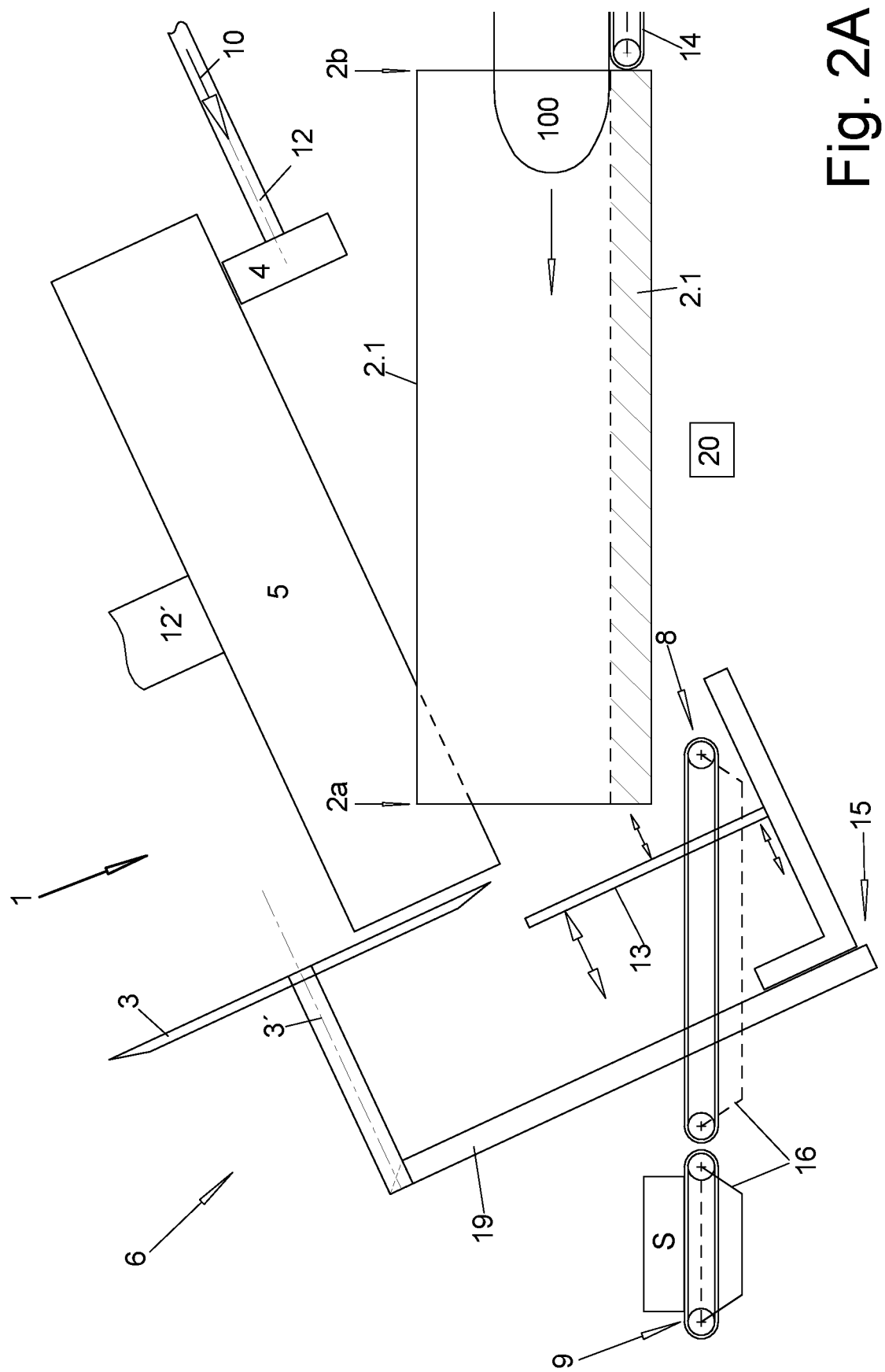
FIG. 2A is a schematic side view of one embodiment of a machine for pressing and slicing loafs in accordance with the teachings of the present disclosure at one of the described functional positions.
Figure 2B:
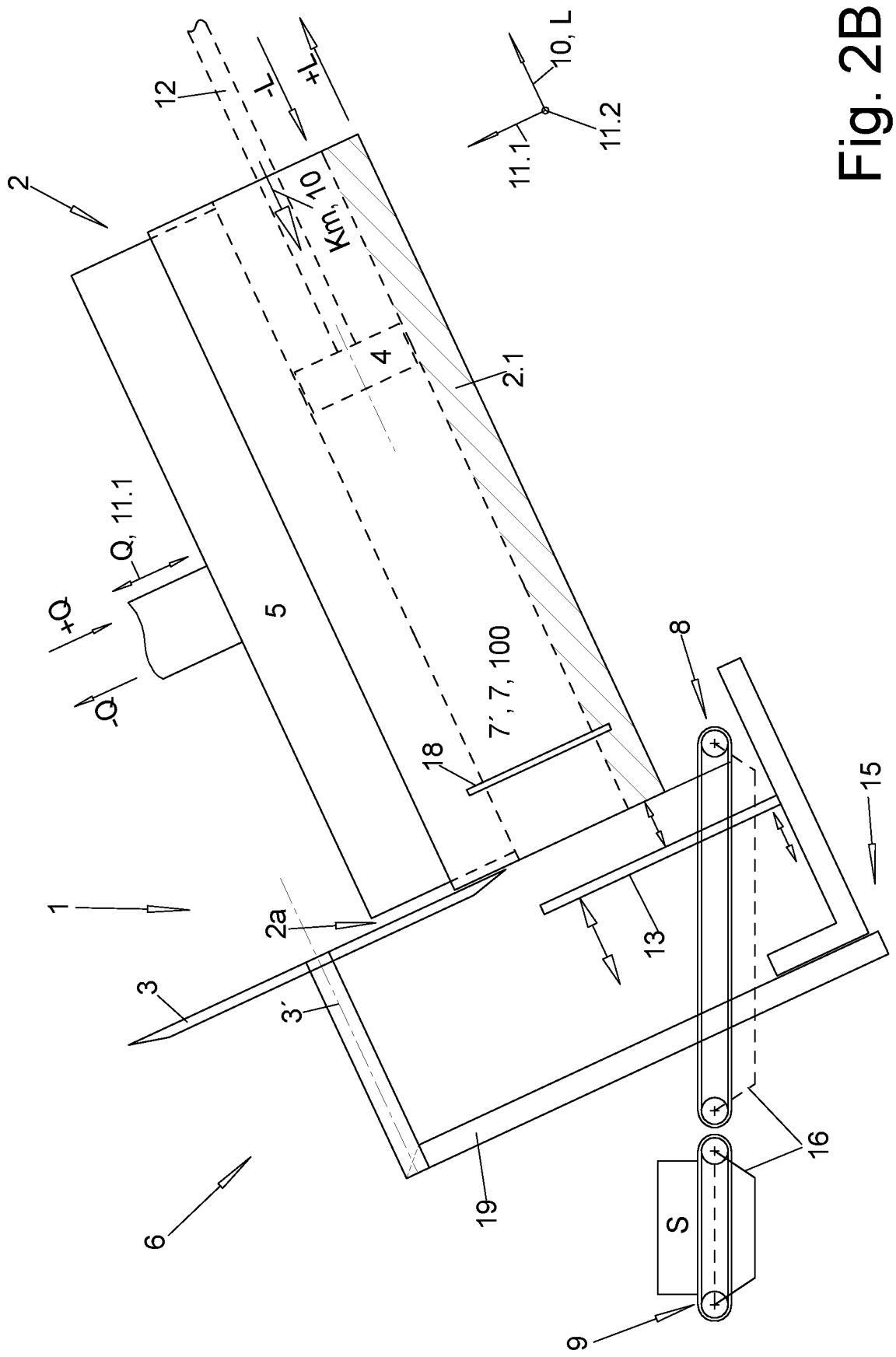
FIG. 2B is a schematic side view of the embodiment of the machine of FIG. 2A at another one of the described functional positions.

Usually, the end target value is not yet applied to the longitudinal pressing plunger 4 during its first longitudinal pressing stroke +L, but only a stroke target value is applied to it, so that in a subsequent at least fifth step S5 the end target value, e.g. the measuring force, is now applied to the longitudinal pressing plunger and—when the transversal pressing plunger 5 has also reached its measuring force—the cross section and length of the loaf 100 are determined, based on which the control 20 of the machine—which is shown in the following FIGS. 2A-2C determines the number of slices 101 of a predefined weight that can be produced therefrom.

FIGS. 2A and 2B show the entire cutting machine 1 which in addition to the forming tube 2 and the pressing plungers 4, 5 comprises a cutting unit 6 for cutting off slices 101 from the pressed loaf 100.

With respect to the forming tube 2, it can be seen that the forming tube 2 in FIG. 2B is arranged so as to be oriented obliquely downwards, and in addition an intermediate plate 18 can be inserted into the forming tube 2 close to the cutting blade end 2a of the forming tube 2 in such a manner that it closes its entire free cross section 7 of the inner free space 7. This is for not having to press the loaf 100 against the stop plate 13 that is moved towards the forming tube 2 during the pressing of the loaf 100, but the intermediate plate 18 that is mounted in a more stable manner inside the forming tube 2 itself.

As the position of the pressing plungers 4, 5 in the longitudinal direction 10 is known, it is nevertheless possible to determine the length 99 of the loaf 100 in the longitudinal direction 10 and its cross-sectional surface 100' as well as the design of the cross-sectional surface in the transversal directions 11.1, 11.2, which are positioned at a right angle to each other and perpendicular to the longitudinal direction 10, from the positions of the pressing plungers 4, 5 in their pressing directions Q, L in the pressed state.

As shown in FIG. 2A, for rendering the loading easier as well as for other purposes, the forming tube duct 2.1 can be folded down into a horizontal position about a pivot axis in its frontal area, here the lower edge at the cutting blade end 2a of the forming tube 2, extending in the second transversal direction 11.2, while the transversal pressing plunger 5 and the longitudinal pressing plunger 4 remain in the original position.

In this folded-down arrangement of the forming tube duct 2.1, a new loaf 100 can be inserted into the forming tube duct 2.1 from the rear loading side end 2b, for example by means of the shown feed conveyor 14.

Subsequently, the forming tube duct 2.1 with the loaf 100 is folded back up in the pressing position extending [in parallel] to the longitudinal pressing direction L, wherein the transversal pressing plunger 5 and the longitudinal pressing plunger 4 are respectively in their maximally retracted position, in which they barely plunge into the forming tube duct 2.1, so as to not collide with the non-pressed loaf 100 inside the forming tube duct 2.1 as the latter is being pivoted upwards.

Subsequently, according to FIG. 2B, the loaf (not shown) is pushed forward against an intermediate plate 18 by means of the longitudinal pressing plunger 4, and also comes into contact with the transversal pressing plunger 5 as the latter is moved in.

Subsequently, the loaf 100 is pressed only as the pressing plunger 4, 5 is advanced further, as described in FIGS. 1A-1C, namely with the measuring force Km indicated in FIG. 2B in the longitudinal direction 10.

FIG. 2C shows the subsequent automatic slicing of the pressed loaf 100 into slices 101:

For this purpose, after the intermediate plate 18 is removed, the pressed loaf 100 is further advanced by means of the longitudinal pressing plunger 4 with a feed force Kv, which preferably corresponds to the measuring force Km, and namely to beyond a cutting blade end 2a of the forming tube 2 to beyond a desired slice thickness, so that, with its frontal end face, the loaf 100 should rest at a longitudinal distance that is set to a corresponding distance 17 with respect to the forming tube 2.

If the position of the loaf 100 for cutting off the next slice 101 in the longitudinal direction 10 is thus reached, the cutting edge of a blade 3, which in this case is round or sickle-shaped and rotates about a blade axis 3', increasingly plunges in the transversal direction into the cross section of the loaf 100 and cuts off a slice.

As the blade 3 plunges in, the stop plate 13 is also moved in the same transversal direction, so that the cut-off slice 101 can fall over the upper edge of the stop plate 13 and onto the removal conveyor 8 located directly below it, which transports it away and then transfers it to a further removal conveyor 9. One of the two removal conveyors, preferably the downstream removal conveyor 9, comprises a scale 16 for weighing the individual produced slices 101, and its weight can be provided as a feedback to the control 20 of the machine for automatically correcting the weight of the following slices 101.

For this purpose, the blade 3 as well as the stop plate 13 are mounted in a movable manner at a base frame 15 of the cutting unit 6, along which the stop plate 13 can be adjusted in the longitudinal direction 10 and along which also the blade 3, which is held at a support arm 19, can be moved at least in one of the transversal directions to the longitudinal direction 10, preferably in the first transversal direction 11.1, the transversal press direction Q of the transversal pressing plunger 5.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for forming an irregularly shaped, elongated loaf of an elastic material into a shape that has a substantially uniform cross section across a length of the loaf, the method comprising:

pressing the loaf in a longitudinal direction of the loaf by placing a first pressing plunger against the loaf in a first pressing direction in a first pressing step, and advancing the first pressing plunger further by a first pressing stroke to press the loaf in the first pressing direction;

pressing the loaf in at least one transverse direction by placing a second pressing plunger against the loaf in a second pressing direction in a second pressing step, and advancing the second pressing plunger by a second pressing stroke, wherein the at least one transverse direction is transverse to the longitudinal direction;

withdrawing at least one of the first pressing plunger in a direction opposite the first pressing direction or the second pressing plunger in a direction opposite the second pressing direction in a first relieving stroke following at least one of the first or second pressing strokes to relieve pressure applied to the loaf in at least one of the first pressing step or the second pressing step; and following the first relieving stroke by a further pressing stroke on the loaf and in the first pressing direction to compress the loaf if the first relieving stroke was performed in the direction opposite the second pressing direction, or following the first relieving stroke by a further pressing stroke on the loaf and in the second pressing direction to compress the loaf if the first relieving stroke was performed in the direction opposite the first pressing direction;

wherein, if the first relieving stroke was performed in the direction opposite the first pressing direction, a distance of the first relieving stroke in the direction opposite the first pressing direction is smaller than a distance of the first pressing stroke in the first pressing direction, or if the first relieving stroke was performed in the direction opposite the second pressing direction, a distance of the first relieving stroke in the direction opposite the second pressing direction is smaller than a distance of the second pressing stroke in the second pressing direction.

2. The method according to claim 1, wherein the first pressing step, the second pressing step and the first relieving stroke are repeated in succession, and wherein, during repetition of the first pressing step, the second pressing step and the first relieving stroke, both the first and the second pressing plungers contact the loaf.

3. The method according to claim 1, wherein the first pressing step and the second pressing step are performed in a forming tube with a circumferentially closed hollow forming space that has a constant cross section along its longitudinal direction, wherein the constant cross section is at least partially defined by the second pressing plunger.

4. The method according to claim 1, wherein one or more control parameters for the first pressing stroke, the second pressing stroke, or the first relieving stroke comprise at least one of compressive force or position of the respective pressing plunger.

5. The method according to claim 1, wherein a control parameter for the first pressing stroke is based on a compressive force applied to the loaf by the first pressing plunger.

6. The method according to claim 1, wherein the first relieving stroke and the further pressing stroke are repeated in succession, and the method further comprises:

continuing the repetition of the first relieving stroke and the further pressing stroke until at least one stroke target value of a control parameter for the further pressing stroke is reached; and continuing the repetition of the first relieving stroke and the further pressing stroke until at least one end target value of the control parameter for the further pressing stroke is reached.

7. The method according to claim 6 wherein the at least one stroke target value or the at least one end target value is predefined.

8. The method according to claim 5, further comprising stopping the pressing the loaf in the longitudinal direction before a stroke target value of the compressive force is reached.

9. The method according to claim 1, wherein a control parameter of the second pressing stroke is based on a compressive force applied to the loaf by the second pressing plunger.

10. The method according to claim 9, further comprising moving the second pressing plunger into such transversal positions with respect to a forming tube that receives the loaf that a remaining free cross section area of the forming tube in the second pressing direction corresponds to a range defined by a smallest extension of the second pressing plunger in the second pressing direction, and a maximum extension of the second pressing plunger in the second pressing direction.

11. The method according to claim 1, further comprising:
moving the second pressing plunger in the second pressing direction in the second pressing stroke until a stroke target value of a control parameter for the second pressing stroke is reached in a transverse pressing step;
withdrawing the second pressing plunger in the direction opposite the second pressing direction in the first relieving stroke following the transverse pressing step;
moving the first pressing plunger in the first pressing direction in the first pressing stroke until a stroke target value of a control parameter for the first pressing stroke is reached in a longitudinal pressing step, the longitudinal pressing step occurring concurrently or after the transverse pressing step; and
following the longitudinal pressing step, withdrawing the first pressing plunger in the direction opposite the first pressing direction by a longitudinal relieving stroke;
wherein the step of following the first relieving stroke by the further pressing stroke comprises repeating the transverse pressing step and the longitudinal pressing step to reach subsequent stroke target values of the first and the second pressing strokes, wherein such subsequent stroke target values of the first and the second pressing strokes increase.

12. The method according to claim 11, wherein the stroke target values of the first pressing stroke are based on one of force applied to the loaf or position of the first pressing plunger.

13. The method according to claim 11, wherein, following the withdrawing the first pressing plunger in the direction opposite the first pressing direction step, at first a transversal relieving stroke and subsequently a transversal pressing stroke are performed with respectively a same distance value travelled.

14. The method according to claim 1, wherein at least one of the first relieving stroke or the further pressing stroke is repeated until at least one stroke target value of a control parameter for the further pressing stroke is reached.

15. The method according to claim 1, wherein at least one of the first relieving stroke or the further pressing stroke is repeated until at least one end target value of a control parameter for the further pressing stroke is reached.

16. The method according to claim 1, wherein the first pressing plunger is moved in the first relieving stroke, and the first relieving stroke is between 2 mm and 20 mm.

17. The method according to claim 1, wherein the second pressing plunger is moved in the first relieving stroke, and the first relieving stroke is between 0.5 mm and 6 mm.

18. The method according to claim 1, wherein the withdrawing comprises withdrawing the first pressing plunger in the direction opposite the first pressing direction in the first relieving stroke, and wherein the further pressing stroke is performed on the loaf by moving the second pressing plunger in the second pressing direction to compress the loaf.

19. The method according to claim 18, further comprising following the further pressing stroke with an additional relieving stroke by withdrawing the second pressing plunger in the direction opposite the second pressing direction, and then performing an additional pressing stroke on the loaf by moving the second pressing plunger in the second pressing direction to compress the loaf.

20. The method according to claim 1, wherein the withdrawing comprises withdrawing the second pressing plunger in the direction opposite the second pressing direction in the first relieving stroke, and wherein the further pressing stroke is performed on the loaf by moving the first pressing plunger in the first pressing direction to compress the loaf.

* * * * *